United States Patent
Sharma et al.

(10) Patent No.: US 11,487,449 B2
(45) Date of Patent: Nov. 1, 2022

(54) DATA STORAGE DEVICE AND METHOD FOR ENABLING HIGHER LANE UTILIZATION IN RUN TIME VIA DEVICE HINTS ON WORKLOAD PATTERNS

(71) Applicant: Western Digital Technologies, Inc., San Jose, CA (US)

(72) Inventors: Avinash Sharma, Jharkhand (IN); Abhijit K Rao, Bengaluru (IN); Bala Siva Kumar Narala, Andhra Pradesh (IN)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/181,621

(22) Filed: Feb. 22, 2021

(65) Prior Publication Data
US 2022/0269425 A1    Aug. 25, 2022

(51) Int. Cl.
   *G06F 3/06* (2006.01)
(52) U.S. Cl.
   CPC .......... *G06F 3/0631* (2013.01); *G06F 3/0604* (2013.01); *G06F 3/0613* (2013.01); *G06F 3/0653* (2013.01); *G06F 3/0658* (2013.01); *G06F 3/0659* (2013.01); *G06F 3/0673* (2013.01)
(58) Field of Classification Search
   CPC .... G06F 3/0613; G06F 3/0604; G06F 3/0631; G06F 3/0653; G06F 3/0658; G06F 3/0659; G06F 3/0673
   See application file for complete search history.

(56) References Cited

U.S. PATENT DOCUMENTS

| | | | |
|---|---|---|---|
| 9,003,071 B2 | 4/2015 | Liu | |
| 10,019,161 B2 | 7/2018 | Sharifie et al. | |
| 10,089,255 B2 | 10/2018 | Rui et al. | |
| 10,146,729 B2 | 12/2018 | Jimenez et al. | |
| 11,061,607 B2* | 7/2021 | Koo | G06F 3/0679 |
| 2008/0195833 A1* | 8/2008 | Park | G06F 3/0679 |
| | | | 711/E12.001 |
| 2016/0188510 A1 | 6/2016 | Singh et al. | |
| 2021/0182166 A1* | 6/2021 | Hahn | G06F 3/0688 |

OTHER PUBLICATIONS

P. Cappelletti, "Non volatile memory evolution and revolution," 2015 IEEE International Electron Devices Meeting (IEDM), 2015, pp. 10.1.1-10.1.4. (Year: 2015).*

(Continued)

*Primary Examiner* — Khoa D Doan
(74) *Attorney, Agent, or Firm* — Crowell & Moring LLP (57) ABSTRACT

A storage system and method for improving utilization of a communication channel between a host and the storage system are provided. In one embodiment, a host sends a request for workload pattern information to the data storage device, and the data storage device provides the requested workload pattern information to the host. Based on that workload pattern information, the host queues commands to be sent to the data storage device to improve utilization of the communication channel between the host and the data storage device. Other embodiments are provided.

20 Claims, 6 Drawing Sheets

(56) References Cited

OTHER PUBLICATIONS

M. Jackson, R. Budruk, "PCI Express Technology Comprehensive Guide to Generations 1.x, 2.x and 3.0," Mindshare 2012 (Year: 2012).*

S. He, Y. Yin, X. -H. Sun, X. Zhang and Z. Li, "Optimizing Parallel I/O Accesses through Pattern-Directed and Layout-Aware Replication," in IEEE Transactions on Computers, vol. 69, No. 2, pp. 212-225, Feb. 1, 2020, doi: 10.1109/TC.2019.2946135. (Year: 2020).*

U.S. Appl. No. 16/717,469, filed Dec. 17, 2019, entitled "Storage System and Method for Improving Utilization of a Communication Channel between a Host and the Storage System,".

* cited by examiner

DATA STORAGE DEVICE AND METHOD FOR ENABLING HIGHER LANE UTILIZATION IN RUN TIME VIA DEVICE HINTS ON WORKLOAD PATTERNS

BACKGROUND

In some data storage device environments, such as those operating under the Non-Volatile Memory Express (NVMe) specification, a host stores a queue of commands (e.g., read commands and/or write commands), and the data storage device selects commands from the queue for execution. When choosing which command to select from the queue, some data storage devices select the command that would result in bandwidth being maximized. Also, some data storage devices use a weighted priority-based scheme for host command selection.

DETAILED DESCRIPTION

Overview

By way of introduction, the below embodiments relate to a data storage device and method for enabling higher lane utilization in run time via device hints on workload patterns. In one embodiment, a method is provided that is performed in a host in communication with a data storage device via a communication channel. The method comprises: sending a request for workload pattern information to the data storage device; receiving the workload pattern information from the data storage device; and queuing commands to be sent to the data storage device based on the workload pattern to improve utilization of the communication channel between the host and the data storage device.

In some embodiments, the workload pattern information comprises a command length.

In some embodiments, the workload pattern information comprises a ratio of read commands and write commands.

In some embodiments, the workload pattern information comprises a command length and a ratio of read commands and write commands.

In some embodiments, the communication channel comprises a full duplex communication channel.

In some embodiments, the communication channel comprises a peripheral component interconnect express (PCIe) interface channel.

In another embodiment, a data storage device is provided comprising a memory and a controller. The controller is configured to: receive a request for workload pattern information from a host to improve utilization of a communication channel between the host and the data storage device; and in response to receiving the request, send the workload pattern information to the host.

In some embodiments, the workload pattern information comprises a command length.

In some embodiments, the workload pattern information comprises a ratio of read commands and write commands.

In some embodiments, the workload pattern information comprises a command length and a ratio of read commands and write commands.

In some embodiments, the controller is further configured to determine the workload pattern information.

In some embodiments, the controller is further configured to determine the workload pattern information based on one or more of the following: past command history, temperature, system-on-chip resources, error information, and a state of the data storage device.

In some embodiments, the controller is further configured to determine the workload pattern information using a dedicated hardware component.

In some embodiments, the controller is further configured to determine the workload pattern information using firmware.

In some embodiments, the controller is further configured to receive commands from the host that are queued based on the workload pattern information sent to the host.

In some embodiments, the communication channel comprises a full duplex communication channel.

In some embodiments, the communication channel comprises a peripheral component interconnect express (PCIe) interface channel.

In some embodiments, the memory comprises a three-dimensional memory.

In some embodiments, the data storage device is integrated in the host.

In another embodiment, a data storage device is provided comprising: a memory; means for receiving a request for workload pattern information from a host to improve utilization of a communication channel between the host and the data storage device; and means for, in response to receiving the request, sending the workload pattern information to the host.

Other embodiments are possible, and each of the embodiments can be used alone or together in combination. Accordingly, various embodiments will now be described with reference to the attached drawings.

Embodiments

The following embodiments relate to a data storage device (DSD). As used herein, a "data storage device" refers to a device that stores data. Examples of DSDs include, but are not limited to, hard disk drives (HDDs), solid state drives (SSDs), tape drives, hybrid drives, etc. Details of example DSDs are provided below.

Figures 1A, 1B:
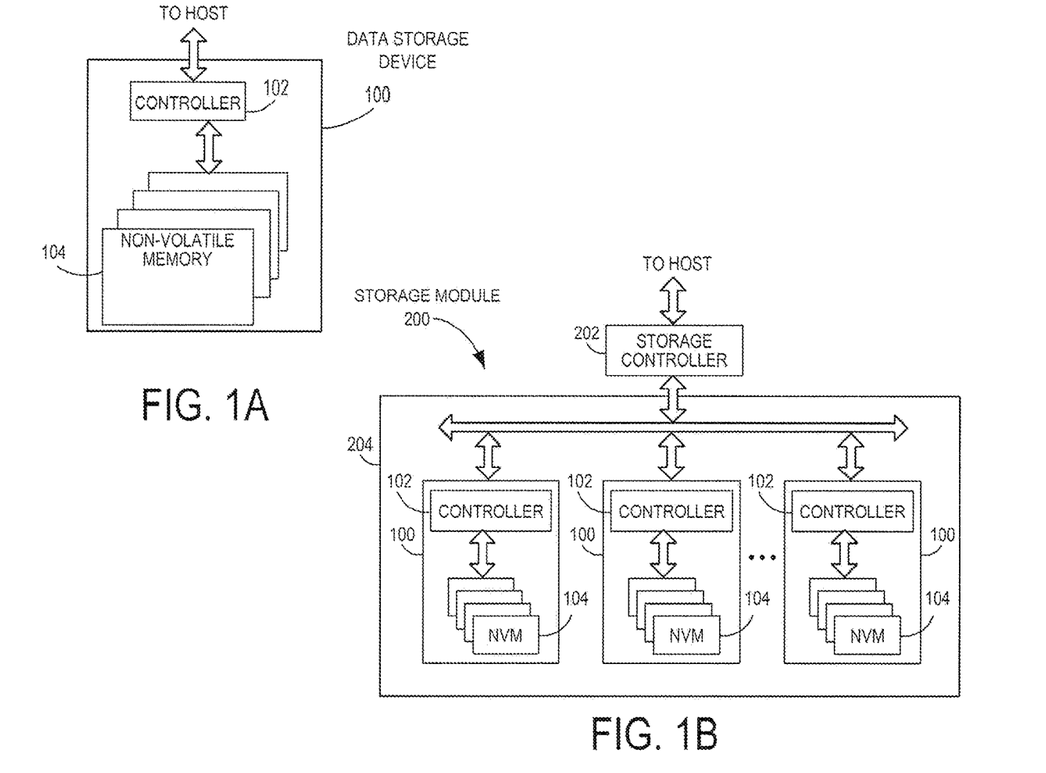
FIG. 1A is a block diagram of a data storage device of an embodiment.
FIG. 1B is a block diagram illustrating a storage module of an embodiment.
Figure 1C:
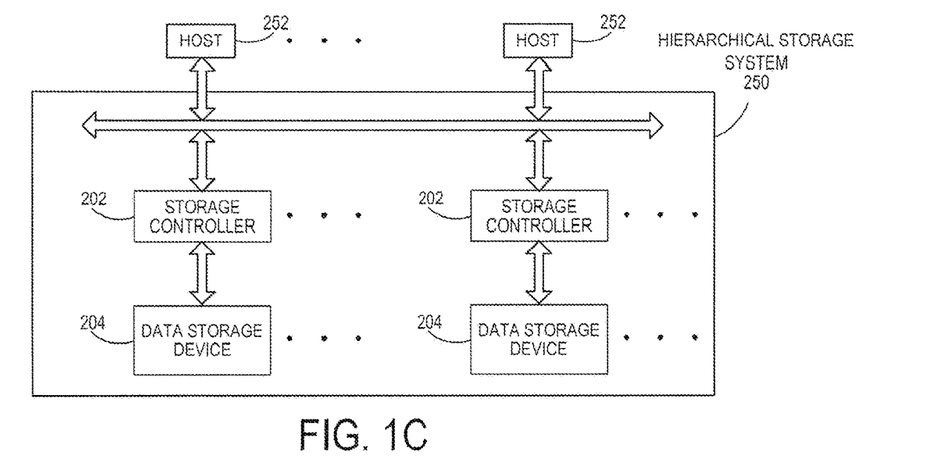
FIG. 1C is a block diagram illustrating a hierarchical storage system of an embodiment.

Data storage devices suitable for use in implementing aspects of these embodiments are shown in FIGS. 1A-1C. FIG. 1A is a block diagram illustrating a data storage device 100 according to an embodiment of the subject matter described herein. Referring to FIG. 1A, data storage device 100 includes a controller 102 and non-volatile memory that may be made up of one or more non-volatile memory die 104. As used herein, the term die refers to the collection of non-volatile memory cells, and associated circuitry for managing the physical operation of those non-volatile memory cells, that are formed on a single semiconductor substrate. Controller 102 interfaces with a host system and transmits command sequences for read, program, and erase operations to non-volatile memory die 104.

The controller 102 (which may be a non-volatile memory controller (e.g., a flash, resistive random-access memory (ReRAM), phase-change memory (PCM), or magnetoresistive random-access memory (MRAM) controller)) can take the form of processing circuitry, a microprocessor or processor, and a computer-readable medium that stores computer-readable program code (e.g., firmware) executable by the (micro)processor, logic gates, switches, an application specific integrated circuit (ASIC), a programmable logic controller, and an embedded microcontroller, for example. The controller 102 can be configured with hardware and/or firmware to perform the various functions described below and shown in the flow diagrams. Also, some of the components shown as being internal to the controller can also be stored external to the controller, and other components can be used. Additionally, the phrase "operatively in communication with" could mean directly in communication with or indirectly (wired or wireless) in communication with through one or more components, which may or may not be shown or described herein.

As used herein, a non-volatile memory controller is a device that manages data stored on non-volatile memory and communicates with a host, such as a computer or electronic device. A non-volatile memory controller can have various functionality in addition to the specific functionality described herein. For example, the non-volatile memory controller can format the non-volatile memory to ensure the memory is operating properly, map out bad non-volatile memory cells, and allocate spare cells to be substituted for future failed cells. Some part of the spare cells can be used to hold firmware to operate the non-volatile memory controller and implement other features. In operation, when a host needs to read data from or write data to the non-volatile memory, it can communicate with the non-volatile memory controller. If the host provides a logical address to which data is to be read/written, the non-volatile memory controller can convert the logical address received from the host to a physical address in the non-volatile memory. (Alternatively, the host can provide the physical address.) The non-volatile memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

Non-volatile memory die 104 may include any suitable non-volatile storage medium, including resistive random-access memory (ReRAM), magnetoresistive random-access memory (MRAM), phase-change memory (PCM), NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC), triple-level cells (TLC), or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, the data storage device 100 may be a card based system, such as a secure digital (SD) or a micro secure digital (micro-SD) card. In an alternate embodiment, the data storage device 100 may be part of an embedded data storage device.

Although, in the example illustrated in FIG. 1A, the data storage device 100 (sometimes referred to herein as a storage module) includes a single channel between controller 102 and non-volatile memory die 104, the subject matter described herein is not limited to having a single memory channel. For example, in some architectures (such as the ones shown in FIGS. 1B and 1C), two, four, eight or more memory channels may exist between the controller and the memory device, depending on controller capabilities. In any of the embodiments described herein, more than a single channel may exist between the controller and the memory die, even if a single channel is shown in the drawings.

FIG. 1B illustrates a storage module 200 that includes plural non-volatile data storage devices 100. As such, storage module 200 may include a storage controller 202 that interfaces with a host and with data storage device 204, which includes a plurality of data storage devices 100. The interface between storage controller 202 and data storage devices 100 may be a bus interface, such as a serial advanced technology attachment (SATA), peripheral component interconnect express (PCIe) interface, or double-data-rate (DDR) interface. Storage module 200, in one embodiment, may be a solid state drive (SSD), or non-volatile dual in-line memory module (NVDIMM), such as found in server PC or portable computing devices, such as laptop computers, and tablet computers.

FIG. 1C is a block diagram illustrating a hierarchical storage system. A hierarchical storage system 250 includes a plurality of storage controllers 202, each of which controls a respective data storage device 204. Host systems 252 may access memories within the storage system 250 via a bus interface. In one embodiment, the bus interface may be a Non-Volatile Memory Express (NVMe) or Fibre Channel over Ethernet (FCoE) interface. In one embodiment, the system illustrated in FIG. 1C may be a rack mountable mass storage system that is accessible by multiple host computers, such as would be found in a data center or other location where mass storage is needed.

Figure 2A:
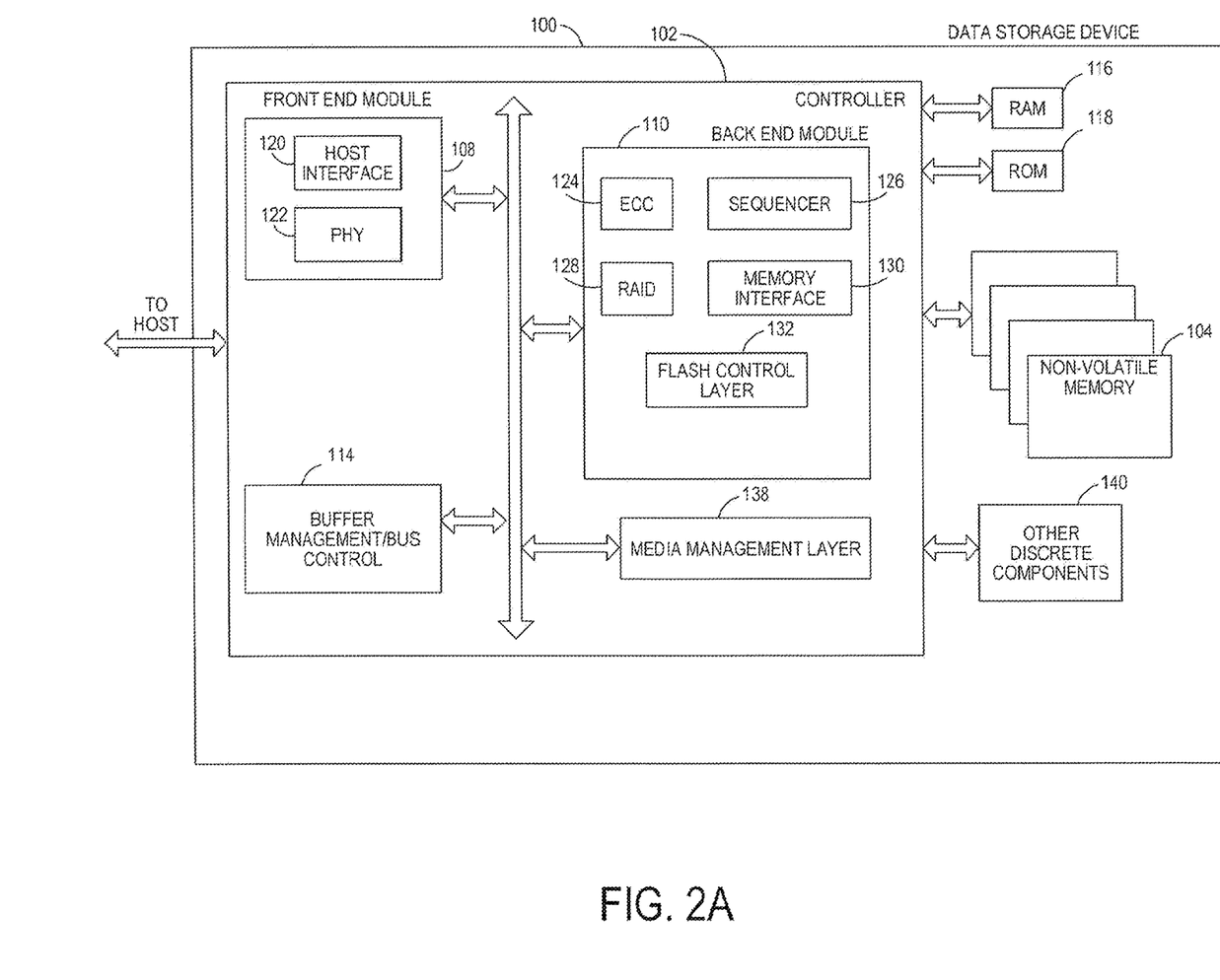
FIG. 2A is a block diagram illustrating components of the controller of the data storage device illustrated in FIG. 1A according to an embodiment.

FIG. 2A is a block diagram illustrating components of controller 102 in more detail. Controller 102 includes a front-end module 108 that interfaces with a host, a back-end module 110 that interfaces with the one or more non-volatile memory die 104, and various other modules that perform functions which will now be described in detail. A module may take the form of a packaged functional hardware unit designed for use with other components, a portion of a program code (e.g., software or firmware) executable by a (micro)processor or processing circuitry that usually performs a particular function of related functions, or a self-contained hardware or software component that interfaces with a larger system, for example. Also, "means" for performing a function can be implemented with at least any of the structure noted herein for the controller and can be pure hardware or a combination of hardware and computer-readable program code.

Referring again to modules of the controller 102, a buffer manager/bus controller 114 manages buffers in random access memory (RAM) 116 and controls the internal bus arbitration of controller 102. A read only memory (ROM) 118 stores system boot code. Although illustrated in FIG. 2A as located separately from the controller 102, in other embodiments one or both of the RAM 116 and ROM 118 may be located within the controller. In yet other embodiments, portions of RAM and ROM may be located both within the controller 102 and outside the controller.

Front-end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, serially attached small computer system interface (SAS), Fibre Channel, universal serial bus (USB), PCIe, and NVMe. The host interface 120 typically facilitates transfer for data, control signals, and timing signals.

Back-end module 110 includes an error correction code (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the memory device 104. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. A flash control layer 132 controls the overall operation of back-end module 110.

The data storage device 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller 114 are optional components that are not necessary in the controller 102.

Figure 2B:
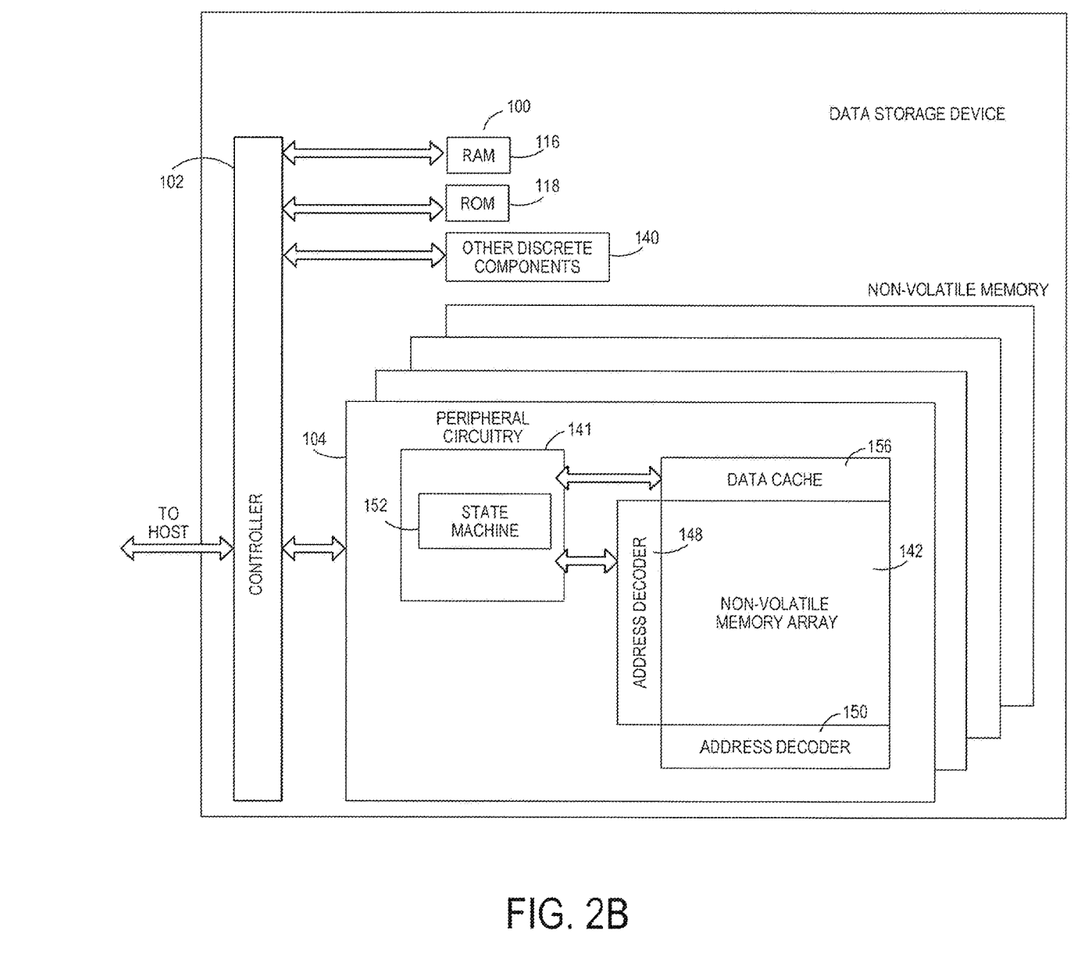
FIG. 2B is a block diagram illustrating components of the memory data storage device illustrated in FIG. 1A according to an embodiment.

FIG. 2B is a block diagram illustrating components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including ReRAM, MRAM, PCM, NAND flash memory cells and/or NOR flash memory cells in a two-dimensional and/or three-dimensional configuration. Non-volatile memory die 104 further includes a data cache 156 that caches data. Peripheral circuitry 141 includes a state machine 152 that provides status information to the controller 102.

Returning again to FIG. 2A, the flash control layer 132 (which will be referred to herein as the flash translation layer (FTL) or, more generally, the "media management layer," as the memory may not be flash) handles flash errors and interfaces with the host. In particular, the FTL, which may be an algorithm in firmware, is responsible for the internals of memory management and translates writes from the host into writes to the memory 104. The FTL may be needed because the memory 104 may have limited endurance, may be written in only multiples of pages, and/or may not be written unless it is erased as a block. The FTL understands these potential limitations of the memory 104, which may not be visible to the host. Accordingly, the FTL attempts to translate the writes from host into writes into the memory 104.

The FTL may include a logical-to-physical address (L2P) map and allotted cache memory. In this way, the FTL translates logical block addresses ("LBAs") from the host to physical addresses in the memory 104. The FTL can include other features, such as, but not limited to, power-off recovery (so that the data structures of the FTL can be recovered in the event of a sudden power loss) and wear leveling (so that the wear across memory blocks is even to prevent certain blocks from excessive wear, which would result in a greater chance of failure).

As mentioned above, in some data storage device environments, such as those operating under the Non-Volatile Memory Express (NVMe) specification, a host stores a queue of commands (e.g., read commands and/or write commands), and the data storage device selects commands from the queue for execution. Other protocols can be used, and the below claims should not be limited to NVMe unless that feature is expressly recited therein.

As also mentioned above, the host and data storage device 100 communicate via an interface or communication channel. The terms interface, communication channel, bus, and lane will be used interchangeably herein to refer to the mechanism through which the host and data storage device 100 communicate with one another. While any suitable communication channel can be used with these embodiments, the below examples will be discussed in terms of a peripheral component interconnect express (PCIe) interface. Again, other communication channels can be used (such as, but not limited to, a Small Computer System Interface (SCSI) bus and a Universal Flash Storage (UFS) bus), and the below claims should not be limited to a PCIe interface unless that feature is expressly recited therein.

PCIe supports full duplex communication, which allows data flow both upstream and downstream simultaneously (i.e., communication from the host to the data storage device 100 can take place at the same time as communication from the data storage device 100 to the host). With the NVMe protocol, depending on the workload, data movement can happen in either direction. A single lane PCIe 3.0 (Gen 3) bus provides throughput of ~1 GB/second in one simplex direction and an aggregate of 2 GB/s. Most commonly, flash translation layers (FTLs) are designed to maximize the random read/write input-output operations per second (IOPS). For the measurement of IOPS, a data storage device is subjected to workloads of pure input-output (I/O) (only reads or write commands) in nature. For data storage devices whose queue depth is large, many commands may not get processed even if the upstream or downstream lane could be free. Although NVMe allows out of order execution, PCIe lane usage is not considered during command selection. Under such workloads, only half of the host bandwidth is utilized. However, real-life workloads on enterprise solid-state drives (SSDs), smartphones, and laptops are mixed I/O.

In order to understand the current utilization of PCIe lanes on NVMe-based data storage devices, experiments on utilization of PCIe lanes were performed using a modelling tool to model system architecture on various NVMe/PCIe data storage devices. The experimental data was derived based on mixed I/O workload, with overlapping/non-overlapping address ranges and different command lengths. The I/O workloads were categorized as: (A) 50% write commands and 50% read commands; (B) 70% write commands and 30% read commands; and (C) 30% write commands and 70% read commands. An overlapping and non-overlapping read write address range was chosen as part of the experiment.

Figure 3:
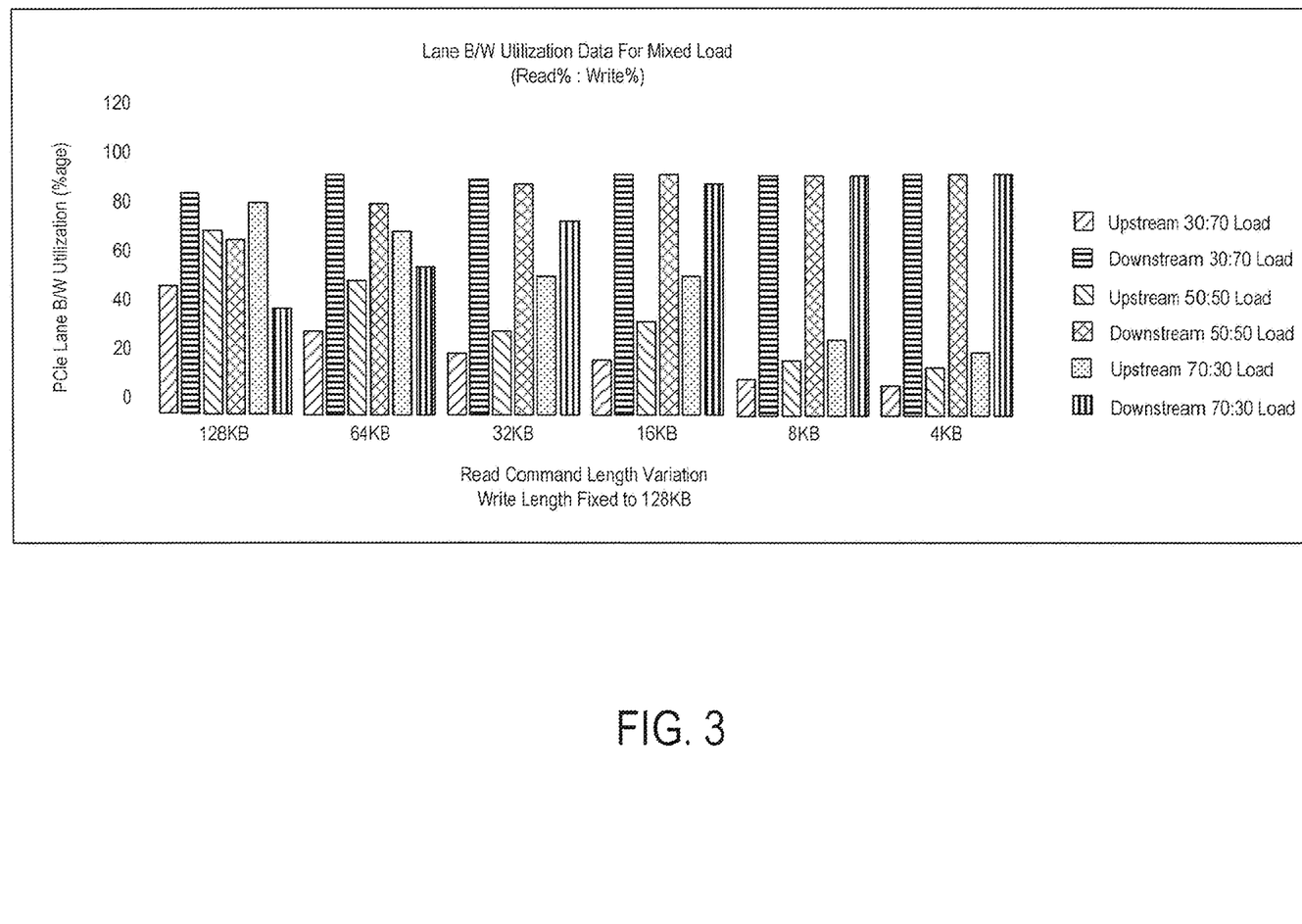
FIG. 3 is a graph of an embodiment showing lane bandwidth utilization for a mixed load with a write length fixed to 128 KB and a varying read length.
Figure 4:
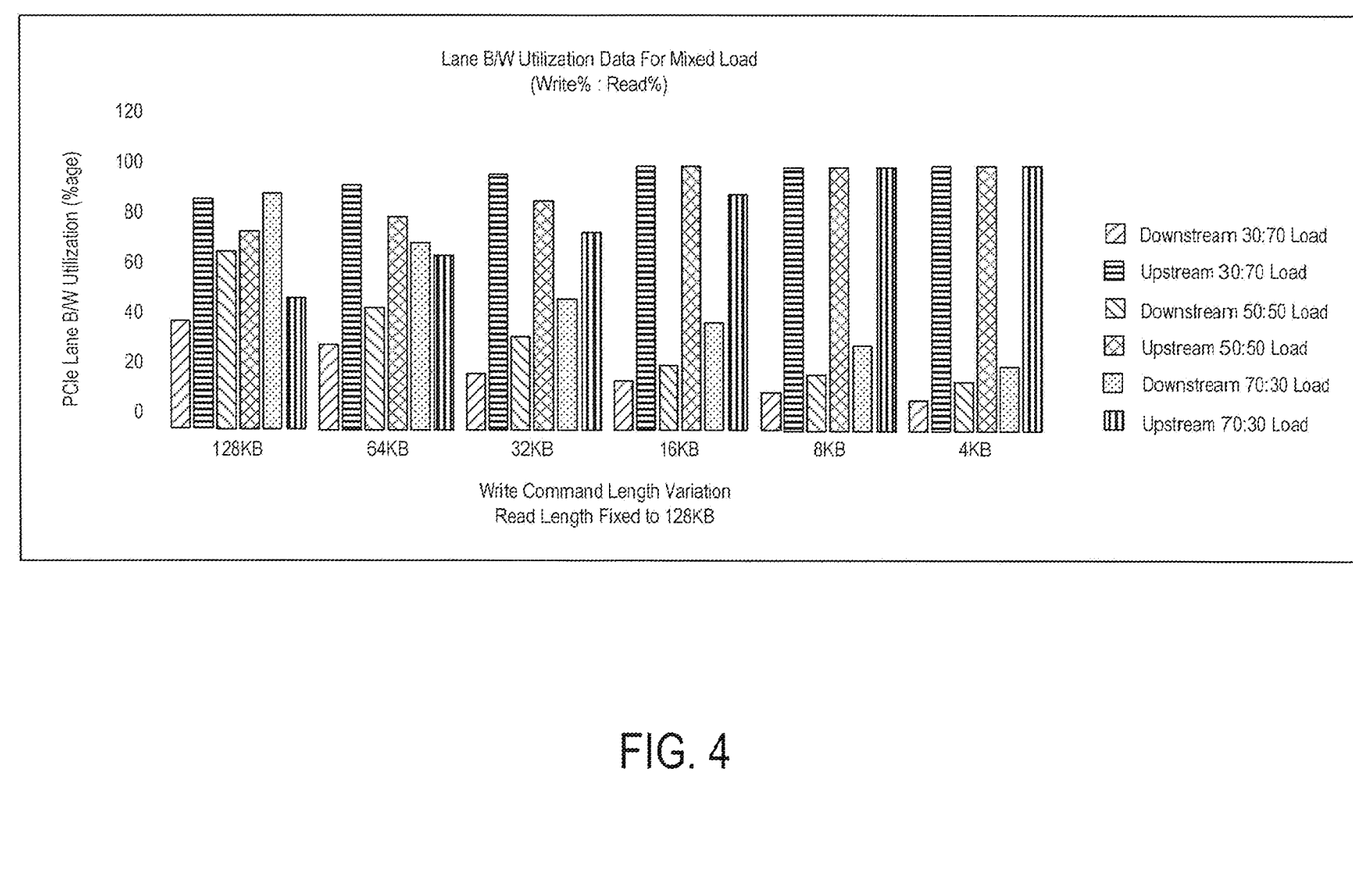
FIG. 4 is a graph of an embodiment showing lane bandwidth utilization for a mixed load with a read length fixed to 128 KB and a varying write length.

FIGS. 3 and 4 show the results of those experiments. FIG. 3 is graph of an embodiment showing lane bandwidth utilization for a mixed load with a write length fixed to 128 KB and a varying read length. FIG. 4 is a graph of an embodiment showing lane bandwidth utilization for a mixed load with a read length fixed to 128 KB and a varying write length. The information in these graphs provides several insights. For example, in each model of I/O workload (A, B, and C), PCIe lanes both upstream and downstream are not 100% utilized even when the memory (e.g., NAND) utilization is less than 100%. Also, in case of a mixed workload with 50% write commands and 50% read commands with equal and varying command length sizes, the PCIe lane utilization never touched 100% in either direction.

In the case of a mixed workload with more focus on write commands (i.e., 70% write and 30% read, with both higher and lower command lengths for writes), the PCIe downstream lane usage was always lower than 100%. In the case of a mixed workload with more focus on read commands (i.e., 70% read and 30% write, with both higher and lower command lengths for reads), the PCIe upstream lane usage was always lower than 100%. The data also shows that NAND utilization was never a bottleneck in all workloads, yet PCIe lane utilization is never optimum. Further, the data shows that command length plays a significant role in PCIe lane utilization and overrides the workload type (A, B, and C) in deciding the PCIe lane utilization.

From these experiments, it can be seen that PCIe lanes are being underutilized if the memory is not working at full capacity and that, for mixed I/O workload, there is an opportunity for PCIe lane utilization improvement, which is being addressed in the below embodiments. U.S. patent application Ser. No. 16/717,469, which is hereby incorporated by reference, provides embodiments that address this issue. In some of those embodiments, the host queues commands randomly, and the data storage device is intelligent enough to schedule those commands such that PCIe lane utilization is maximized.

The following embodiments provide a different solution, which is based on the observation that these experiments show that PCIe lane utilization is dependent on the type of workload (i.e., the read-to-write (R/W) ratio) and command length). Hence, by varying the command lengths and workload R/W ratio, hosts can achieve higher performance for mixed I/O workload.

By way of background, the host is virtually unaware of internals of the data storage device's firmware or the data storage device's state. Depending on the internal state, the data storage device may respond to varying workload patterns differently. However, for a given data storage device state, the PCIe lane utilization maximized only for few workload patterns. So, in one embodiment, the data storage device 100 responds with workload patterns in terms of command length and/or R/W ratio when queried by a host. When the host alters its load pattern based on the data-storage-device-hinted workload information, PCIe lane utilization can be improved. For maximum performance (lane utilization) throughout the operation, the host can frequently query the data storage device for the workload pattern.

In one example implementation, to enable higher PCIe lane utilization (aggregate bandwidth) in run time via data storage device hints, a new command can be used that explores the possibility of performance improvement by the way of the data storage device providing hints to the host on possible workload alterations. The host queues the commands based on the device-hinted workload pattern. The data storage device is intelligent enough to provide a hint to the host on a workload pattern that maximizes PCIe lane utilization.

While the new command can take any form, in one embodiment, the new command is named Get Device hints and is submitted by the host software to enable reporting of the device hints from the data storage device's controller 102. This command is used by the host to get device hints on the workload pattern, which is also referred to here as workload pattern information.

The data storage device's controller 102 can respond to the command with the workload pattern information (hints) in terms of command length and/or R/W ratio, for example. These values can be determined by the controller 102 at run time using its internal algorithms (e.g., using a dedicated hardware component or firmware). The command can be independent of any particular protocol and, in one embodiment, is applied to NVMe to provide an improvement in PCIe lane utilization.

The following chart provides one example response format of an embodiment. It is important to note that this is merely an example, and other formats can be used.

| Bit | Description | |
|---|---|---|
| 31:00 | Hints Field: This field specifies the hint required by the host in order modify its workload pattern to improve PCIe lane utilization. | |
| | Bits | Definition |
| | 7:0 | Command Length hint: Provide hint on optimal command length |
| | | 0 h: 4 KB |
| | | 1 h: 8 KB |
| | | 2 h: 16 KB |
| | | 3 h: 32 KB |
| | | 4 h: 64 KB |
| | | 5 h: 128 KB |
| | | 6 h: 256 KB |
| | | 7 H: 512 KB (maximum length in NVMe) |
| | 11:8 | IO Workload hint: Provide hint on workload ratio between read and write commands. |
| | | 8 h: 30:70 read:write workload ratio |
| | | 9 h: 70:30 read:write workload ratio |
| | | 10 h: 50:50 read:write workload ratio |
| | | 11 h: Reserved |
| | 31:12 | Reserved |

Figure 5:
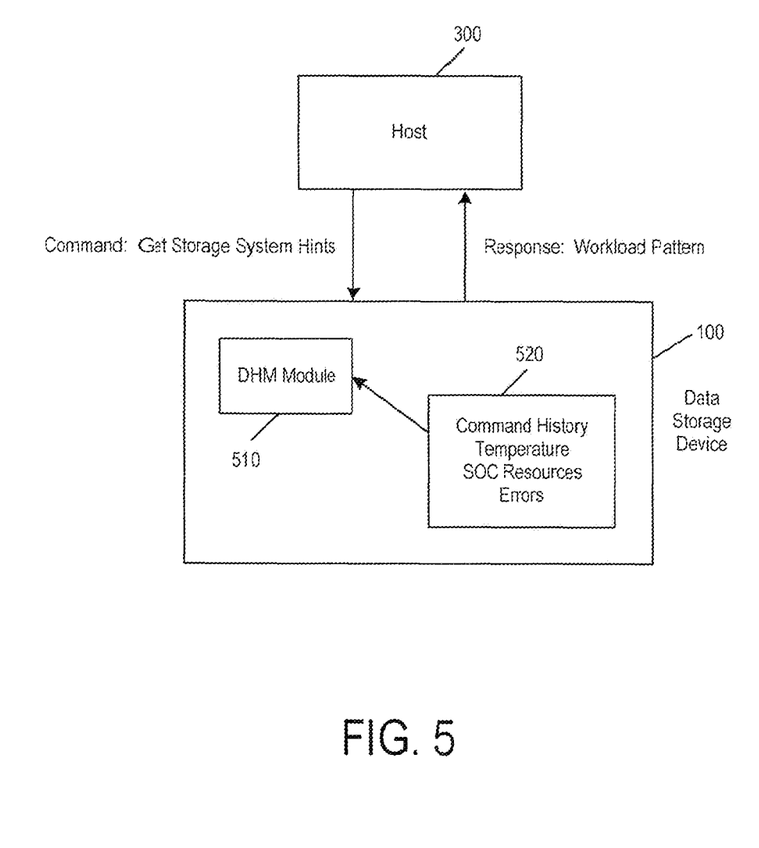
FIG. 5 is a block diagram of a host and a data storage device of an embodiment.

Returning to the drawings, FIG. 5 is a block diagram of a data storage device 100 and host 300 of an embodiment. As shown in FIG. 5, in this embodiment, the data storage device 100 comprises a device hint module (DHM) 510 and a memory 520 operative to store various factors. The device hint module 510 can be implemented in any suitable way (e.g., as a separate hardware component or as part of firmware). In one embodiment, device hint module 510 is implemented in the data storage device's controller 102.

In general, the device hint module 510 contains logic configured to determine the workload pattern and may calculate the optimum workload R/W ratio and/or command length based on several factors, which can be stored in the memory 520 (e.g., in the controller 102 or outside of the controller 102). These factors can include, but are not limited to, past command history, temperature, system-on-chip (SOC) resources, errors, device state, and other secondary factors. One example expression of this using some of these factors is: Workload pattern(t, command length, Workload R/W ratio)=Fx (command history, device temperature(t), resources(t), device state).

There are several advantages associated with these embodiments. For example, these embodiments can be used to improve input-output operations per second (IOPS) for a mixed workload in scenarios, such as, but not limited to, enterprise devices, cell phones, and client devices. In case of pure workload, these embodiments can offer improved IOPS performance in comparison to current methods. Further, with data storage devices that no longer remain statically tested for a given set of patterns, these embodiments can be used to adapt to various patterns and provide the host with useful hints that can aid performance improvement. All of this can provide improved utilization of PCIe bus bandwidth and higher throughput for the host.

As data storage devices get more compute intensive, additional hint algorithms can be developed that complement the host's behavior. As such, these embodiments may be especially advantageous for use in faster data storage devices that have multiple cores and faster memory, such as storage class memory. Greater utilization of the host bus provides the advantage of keeping the data storage device busy and thus preventing the bus usage from becoming a bottleneck.

Finally, as mentioned above, any suitable type of memory can be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are examples, and memory elements may be otherwise configured.

The semiconductor memory elements located within and/or over a substrate may be arranged in two or three dimensions, such as a two dimensional memory structure or a three dimensional memory structure.

In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and wordlines.

A three dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two dimensional and three dimensional structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the embodiments described herein can be used alone or in combination with one another.

What is claimed is:

1. A method for improving utilization of a communication channel between a host and a data storage device, the method comprising:
    performing the following in a host in communication with a data storage device via a communication channel:
        sending a request for workload pattern information to the data storage device, wherein the workload pattern information comprises a ratio of read commands and write commands;
        receiving the workload pattern information from the data storage device; and
        queuing commands to be sent to the data storage device based on the workload pattern information to improve utilization of the communication channel between the host and the data storage device.

2. The method of claim 1, wherein the workload pattern information further comprises a command length.

3. The method of claim 1, wherein the communication channel comprises a full duplex communication channel.

4. The method of claim 1, wherein the communication channel comprises a peripheral component interconnect express (PCIe) interface channel.

5. A data storage device comprising:
    a memory; and
    a controller configured to be in communication with the memory, wherein the controller is further configured to:
        receive a request for workload pattern information from a host, wherein the workload pattern information comprises a ratio of read commands and write commands;
        in response to receiving the request, send the workload pattern information to the host; and
        receive commands from the host, wherein an order in which the commands are received is established by a queuing order set by the host based on the workload pattern information to improve utilization of a communication channel between the host and the data storage device.

6. The data storage device of claim 5, wherein the workload pattern information further comprises a command length.

7. The data storage device of claim 5, wherein the controller is further configured to determine the workload pattern information.

8. The data storage device of claim 7, wherein the controller is further configured to determine the workload pattern information based on past command history.

9. The data storage device of claim 7, wherein the controller is further configured to determine the workload pattern information using a dedicated hardware component.

10. The data storage device of claim 7, wherein the controller is further configured to determine the workload pattern information using firmware.

11. The data storage device of claim 7, wherein the controller is further configured to determine the workload pattern information based on temperature.

12. The data storage device of claim 7, wherein the controller is further configured to determine the workload pattern information based on system-on-chip resources.

13. The data storage device of claim 7, wherein the controller is further configured to determine the workload pattern information based on error information.

14. The data storage device of claim 7, wherein the controller is further configured to determine the workload pattern information based on a state of the data storage device.

15. The data storage device of claim 5, wherein the controller is further configured to receive commands from the host that are queued based on the workload pattern information sent to the host.

16. The data storage device of claim 5, wherein the communication channel comprises a full duplex communication channel.

17. The data storage device of claim 5, wherein the communication channel comprises a peripheral component interconnect express (PCIe) interface channel.

18. The data storage device of claim 5, wherein the memory comprises a three-dimensional memory.

19. The data storage device of claim 5, wherein the data storage device is integrated in the host.

20. A data storage device comprising:
    a memory;
    means for receiving a request for workload pattern information from a host to improve utilization of a communication channel between the host and the data storage device, wherein the workload pattern information comprises a ratio of read commands and write commands;
    means for sending, in response to receiving the request, the workload pattern information to the host; and
    means for receiving commands from the host, wherein an order in which the commands are received is established by a queuing order set by the host based on the workload pattern information to improve utilization of the communication channel between the host and the data storage device.

* * * * *